(12) United States Patent
Mishra

(10) Patent No.: US 7,876,990 B1
(45) Date of Patent: Jan. 25, 2011

(54) LOW LOSS OPTICAL FIBER

(75) Inventor: Snigdharaj Kumar Mishra, Wilmington, NC (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 12/626,305

(22) Filed: Nov. 25, 2009

(51) Int. Cl.
G02B 6/02 (2006.01)
G02B 6/036 (2006.01)

(52) U.S. Cl. ...................... 385/123; 385/127
(58) Field of Classification Search ........... 385/123, 385/124, 126, 127, 128, 140, 141, 142; 65/385
See application file for complete search history.

(56) References Cited

U.S. PATENT DOCUMENTS

| | | | | |
|---|---|---|---|---|
| 6,904,215 B2 | 6/2005 | Christoff et al. | ............ | 385/124 |
| 7,024,083 B2* | 4/2006 | Bickham et al. | ............ | 385/123 |
| 7,171,090 B2* | 1/2007 | Mattingly et al. | ............ | 385/124 |
| 7,187,833 B2* | 3/2007 | Mishra | ............ | 385/127 |
| 7,254,305 B2* | 8/2007 | Mishra | ............ | 385/127 |
| 7,489,859 B2* | 2/2009 | deVos et al. | ............ | 392/441 |
| 7,502,539 B2* | 3/2009 | Gray et al. | ............ | 385/123 |
| 7,689,085 B1* | 3/2010 | Mishra | ............ | 385/127 |
| 2005/0244120 A1* | 11/2005 | Mishra | ............ | 385/127 |
| 2007/0003199 A1* | 1/2007 | Mattingly et al. | ............ | 385/124 |
| 2010/0195966 A1* | 8/2010 | Bickham et al. | ............ | 385/128 |

OTHER PUBLICATIONS

Single-Mode Fiber Optics; Luc B. Jeunhomme; Photonetics, Marly le Roi, France; p. 39-44, Year 1990.

* cited by examiner

Primary Examiner—Akm E Ullah
(74) Attorney, Agent, or Firm—Matthew J. Mason

(57) ABSTRACT

An optical waveguide fiber is provided that includes a core and a cladding, where the core includes an alpha profile, wherein alpha ($\alpha$) is greater than 2.5 and less than 3.0. The core and the cladding provide a fiber with an attenuation of less than 0.331 dB/km at a wavelength of 1310 nm, an attenuation of less than 0.328 dB/km at a wavelength of 1383 nm, an attenuation of less than 0.270 dB/km at a wavelength of 1410 nm, and an attenuation of less than 0.190 dB/km at a wavelength of 1550 nm. Methods for producing the optical fiber are also provided.

20 Claims, 6 Drawing Sheets

LOW LOSS OPTICAL FIBER

BACKGROUND

The disclosure relates generally to optical fibers, and particularly to single mode optical fibers having low attenuation.

Demand for single mode optical fiber suitable for use in a variety of applications and meeting industry standards, such as ITU-T G.652, continues to increase. However, optical fiber attributes such as attenuation and bend loss contribute to the degradation of the signal of such fibers. Consequently, there is a tremendous amount of commercial interest in reducing attenuation and bend loss.

SUMMARY

One embodiment includes an optical waveguide fiber that includes a core and a cladding, the core having a relative refractive index profile $\Delta(r)$ expressed in units of %. The core includes an alpha profile having an initial point $r_i$ and a final point $r_f$, wherein alpha ($\alpha$) is greater than 2.5 and less than 3.0, a maximum relative refractive index $\Delta_{1MAX}$, and an outer radius $R_1$. The core and the cladding provide a fiber with an attenuation of less than 0.331 dB/km at a wavelength of 1310 nm, an attenuation of less than 0.328 dB/km at a wavelength of 1383 nm, an attenuation of less than 0.270 dB/km at a wavelength of 1410 nm, and an attenuation of less than 0.190 dB/km at a wavelength of 1550 nm.

Another embodiment includes a method for producing an optical fiber. The method includes drawing the fiber from a heated glass source. In addition, the method includes treating the optical fiber by maintaining the optical fiber in a treatment zone, while subjecting the optical fiber to an average cooling rate in the treatment zone of less than 5,000° C./s. The average cooling rate in the treatment zone is defined as a fiber entry surface temperature to the treatment zone minus a fiber exit surface temperature from the treatment zone divided by the total residence time of the optical fiber in the treatment zone. The surface temperature of the optical fiber exiting the treatment zone is at least about 1,000° C. The optical fiber has a core and a cladding and the core and the cladding provide a fiber with an attenuation of less than 0.323 dB/km at a wavelength of 1310 nm, an attenuation of less than 0.310 dB/km at a wavelength of 1383 nm, an attenuation of less than 0.260 dB/km at a wavelength of 1410 nm, and an attenuation of less than 0.184 dB/km at a wavelength of 1550 nm.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description present exemplary embodiments, and are intended to provide an overview or framework for understanding the nature and character of the claims. The accompanying drawings are included to provide a further understanding, and are incorporated into and constitute a part of this specification. The drawings illustrate various embodiments, and together with the description serve to explain the principles and operations of the various embodiments.

DETAILED DESCRIPTION

Figure 1:
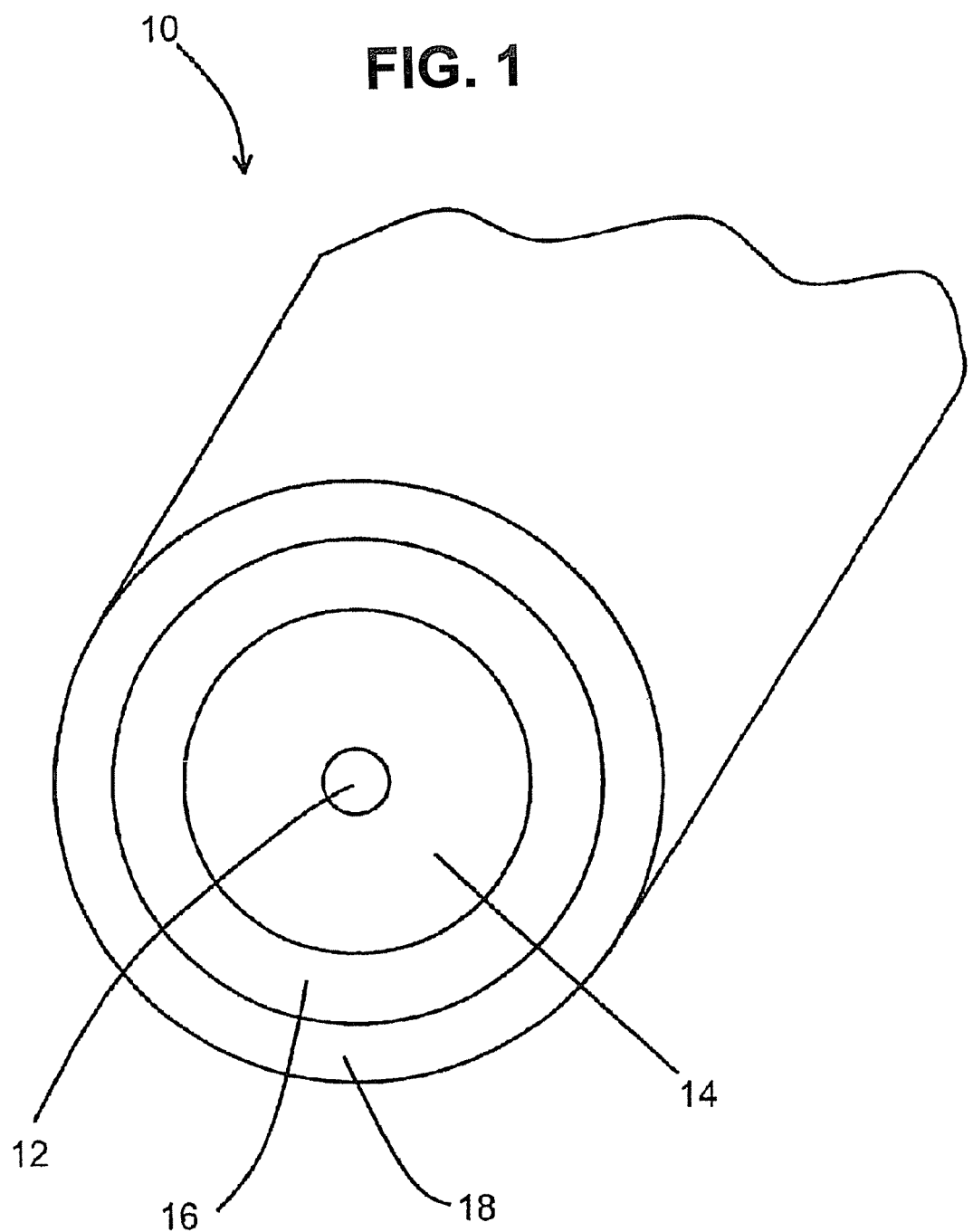
FIG. 1 illustrates schematically an embodiment of an optical waveguide fiber.

Reference will now be made in detail to the present preferred embodiments, examples of which are illustrated in the accompanying drawings.

The "refractive index profile" is the relationship between refractive index or relative refractive index and waveguide fiber radius.

The "relative refractive index percent" is defined as $\Delta\% = 100 \times (n_i^2 - n_c^2)/2n_i^2$, where $n_i$ is the maximum refractive index in region i, unless otherwise specified, and $n_c$ is the average refractive index of the outermost region of the cladding. As used herein, the relative refractive index is represented by $\Delta$ and its values are given in units of "%", unless otherwise specified.

"Chromatic dispersion", herein referred to as "dispersion" unless otherwise noted, of a waveguide fiber is the sum of the material dispersion, the waveguide dispersion, and the inter-modal dispersion. In the case of single mode waveguide fibers the inter-modal dispersion is zero. Dispersion slope is the rate of change of dispersion with respect to wavelength.

"Effective area" is defined as:

$$A_{eff} = 2\pi(\int f^2 r\, dr)^2/(\int f^4 r\, dr),$$

where the integration limits are 0 to ∞, and f is the transverse component of the electric field associated with light propagated in the waveguide. As used herein, "effective area" or "$A_{eff}$" refers to optical effective area at a wavelength of 1550 nm unless otherwise noted.

The term "α-profile" or "alpha profile" refers to a relative refractive index profile, expressed in terms of $\Delta(r)$ which is in units of "%", where r is radius, which follows the equation, $$\Delta(r) = (\Delta(r_o) - \Delta(r_1))(1 - [|r - r_o|/(r_1 - r_o)]^\alpha) + \Delta(r_1),$$

where $r_o$ is the point along the alpha profile at which $\Delta(r)$ is maximum, $r_1$ is the point along the alpha profile at which $\Delta(r)$ is minimum, and r is in the range $r_i \leq r \leq r_f$, where $\Delta$ is defined above, $r_i$ is the initial point of the α-profile, $r_f$ is the final point of the α-profile, and α is an exponent which is a real number.

The mode field diameter (MFD) is measured using the Peterman II method wherein, 2w=MFD, and $w^2 = (2\int f^2 r\, dr/\int [df/dr]^2 r\, dr)$, the integral limits being 0 to ∞.

The bend resistance of a waveguide fiber can be gauged by induced attenuation under prescribed test conditions, for example by deploying or wrapping the fiber around a mandrel of a prescribed diameter.

One type of bend test is the lateral load microbend test. In this so-called "lateral load" test, a prescribed length of waveguide fiber is placed between two flat plates. A #70 wire mesh is attached to one of the plates. A known length of the optical waveguide fiber is sandwiched between the plates and a reference attenuation is measured while the plates are pressed together with a force of 30 newtons. A 70 newton force is then applied to the plates and the increase in attenuation in dB/m is measured. The increase in attenuation is the lateral load attenuation of the waveguide.

The "pin array" bend test is used to compare relative resistance of an optical waveguide fiber to bending. To perform this test, attenuation loss is measured for a waveguide fiber with essentially no induced bending loss. The optical waveguide fiber is then woven about the pin array and attenuation again measured. The loss induced by bending is the difference between the two measured attenuations. The pin array is a set of ten cylindrical pins arranged in a single row and held in a fixed vertical position on a flat surface. The pin spacing is 5 mm, center to center. The pin diameter is 0.67 mm. During testing, sufficient tension is applied to make the optical waveguide fiber conform to a portion of the pin surface.

The theoretical fiber cutoff wavelength, or "theoretical fiber cutoff", or "theoretical cutoff", for a given mode, is the wavelength above which guided light cannot propagate in that mode. A mathematical definition can be found in Single Mode Fiber Optics, Jeunhomme, pp. 39-44, Marcel Dekker, New York, 1990 wherein the theoretical fiber cutoff is described as the wavelength at which the mode propagation constant becomes equal to the plane wave propagation constant in the outer cladding. This theoretical wavelength is appropriate for an infinitely long, perfectly straight fiber that has no diameter variations.

The effective fiber cutoff is lower than the theoretical cutoff due to losses that are induced by bending and/or mechanical pressure. In this context, the cutoff refers to the higher of the LP11 and LP02 modes. LP11 and LP02 are generally not distinguished in measurements, but both are evident as steps in the spectral measurement, i.e. no power is observed in the mode at wavelengths longer than the measured cutoff. The actual fiber cutoff can be measured by the standard 2m fiber cutoff test, FOTP-80 (EIA-TIA-455-80), to yield the "fiber cutoff wavelength", also known as the "2m fiber cutoff" or "measured cutoff". The FOTP-80 standard test is performed to either strip out the higher order modes using a controlled amount of bending, or to normalize the spectral response of the fiber to that of a multimode fiber.

The cabled cutoff wavelength, or "cable cutoff" is even lower than the measured fiber cutoff due to higher levels of bending and mechanical pressure in the cable environment. The actual cabled condition can be approximated by the cabled cutoff test described in the EIA-445 Fiber Optic Test Procedures, which are part of the EIA-TIA Fiber Optics Standards, that is, the Electronics Industry Alliance—Telecommunications Industry Association Fiber Optics Standards, more commonly known as FOTP's. Cabled cutoff measurement is described in EIA-455-170 Cable Cutoff Wavelength of Single-mode Fiber by Transmitted Power, or "FOTP-170".

Unless otherwise noted herein, optical properties (such as dispersion, dispersion slope, etc.) are reported for the LP01 mode. Unless otherwise noted herein, a wavelength of 1550 nm is the reference wavelength.

In accordance with embodiments disclosed herein, and as illustrated in FIG. 1, an optical waveguide fiber 10 includes a core 12 and at least one cladding 14 surrounding the core 12. In preferred embodiments, cladding 14 is pure silica and core 12 is silica doped with one or more dopants. In a particularly preferred embodiment, core 12 is doped with an index increasing dopant such as Ge to obtain the desired change in relative refractive index (e.g., 3.5-4.2 mole % of Ge). Core 12 may also be optionally doped with one or more index decreasing dopants, such as boron or fluorine. Preferably, the diameter of the core 12 varies from about 9 to about 16 µm. Preferably, the outer diameter of the cladding 14 of the optical fiber 10 is about 125 µm. Preferably, cladding region 14 has an outer radius of at least about 40 µm. As is customary, the fiber may be coated with layers of polymer coatings 16 and 18.

Core 12 of optical waveguide fiber 10 extends radially outwardly from a centerline to a radius $R_1$ and has a relative refractive index profile $\Delta(r)$ expressed in units of %, with a maximum relative refractive index percent, $\Delta_{1MAX}$. $R_1$ is defined to occur at the radius where $\Delta(r)$ first reaches 0.02% going radially outward from $\Delta_{1MAX}$.

Figure 2:
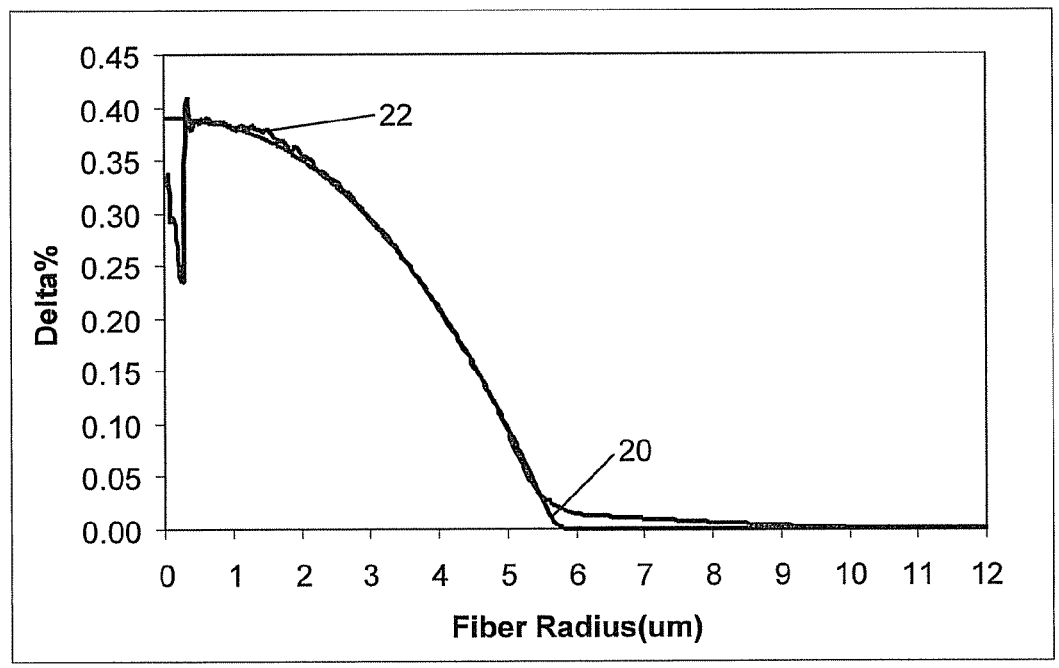
FIG. 2 illustrates a refractive index profile of an exemplary embodiment of an optical waveguide fiber.

A refractive index profile (Profile 1) of an exemplary embodiment of an optical fiber as disclosed herein is illustrated in FIG. 2, which shows a target profile 20 and an actual core cane profile 22 manufactured to correspond to the target profile. The profile parameters of the embodiment illustrated in FIG. 2 are set forth in Table 1.

TABLE 1

| Target Profile | | Actual Profile | |
|---|---|---|---|
| Radius (µm) | Delta (%) | Radius (µm) | Delta (%) |
| 0 | 0.390 | 0 | 0.325 |
| 0.248 | 0.390 | 0.243 | 0.234 |
| 0.496 | 0.388 | 0.488 | 0.385 |
| 1.017 | 0.381 | 1.000 | 0.380 |
| 1.513 | 0.369 | 1.512 | 0.380 |
| 2.009 | 0.351 | 2.000 | 0.356 |
| 2.505 | 0.326 | 2.512 | 0.329 |
| 3.001 | 0.295 | 3.000 | 0.296 |
| 3.522 | 0.254 | 3.512 | 0.255 |
| 4.018 | 0.209 | 4.000 | 0.209 |
| 4.514 | 0.156 | 4.512 | 0.155 |
| 5.010 | 0.096 | 5.000 | 0.094 |
| 5.506 | 0.029 | 5.512 | 0.030 |
| 6.002 | 0.000 | 6.000 | 0.014 |
| 7.020 | 0.000 | 7.000 | 0.010 |
| 8.012 | 0.000 | 8.000 | 0.006 |
| 9.004 | 0.000 | 9.000 | 0.003 |
| 10.020 | 0.000 | 10.000 | 0.001 |

The modeled (predicted) performance parameters of the embodiment illustrated in FIG. 2 are set forth in Table 2.

TABLE 2

| Property | Profile 1 |
|---|---|
| Dispersion at 1310 nm (ps/(nm · km)) | −0.772 |
| Dispersion Slope at 1310 nm (ps/(nm² · km)) | 0.087 |
| Mode Field Diameter (MFD) at 1310 nm (µm) | 9.200 |
| Effective Area (Aeff) at 1310 nm (µm²) | 64.600 |
| Dispersion at 1550 nm (ps/(nm · km)) | 16.610 |
| Dispersion Slope at 1550 nm (ps/(nm² · km)) | 0.056 |
| Mode Field Diameter (MFD) at 1550 nm (µm) | 10.480 |
| Effective Area (Aeff) at 1550 nm (µm²) | 82.330 |
| LP11 Cutoff (nm) | 1330.0 |
| $\lambda_0$ (nm) | 1318.0 |
| Cable Cutoff (nm) | 1192.0 |
| Attenuation at 1310 nm (dB/km) | 0.3301 |
| Attenuation at 1383 nm (dB/km) | 0.3270 |
| Attenuation at 1410 nm (dB/km) | 0.2687 |
| Attenuation at 1550 nm (dB/km) | 0.1898 |
| Pin Array Macrobend Loss at 1550 nm (dB) | 9.49 |

TABLE 2-continued

| Property | Profile 1 |
|---|---|
| Lateral Load Microbend Loss at 1550 nm (dB/m) | 0.64 |
| Alpha (α) | 2.62 |

Figure 3:
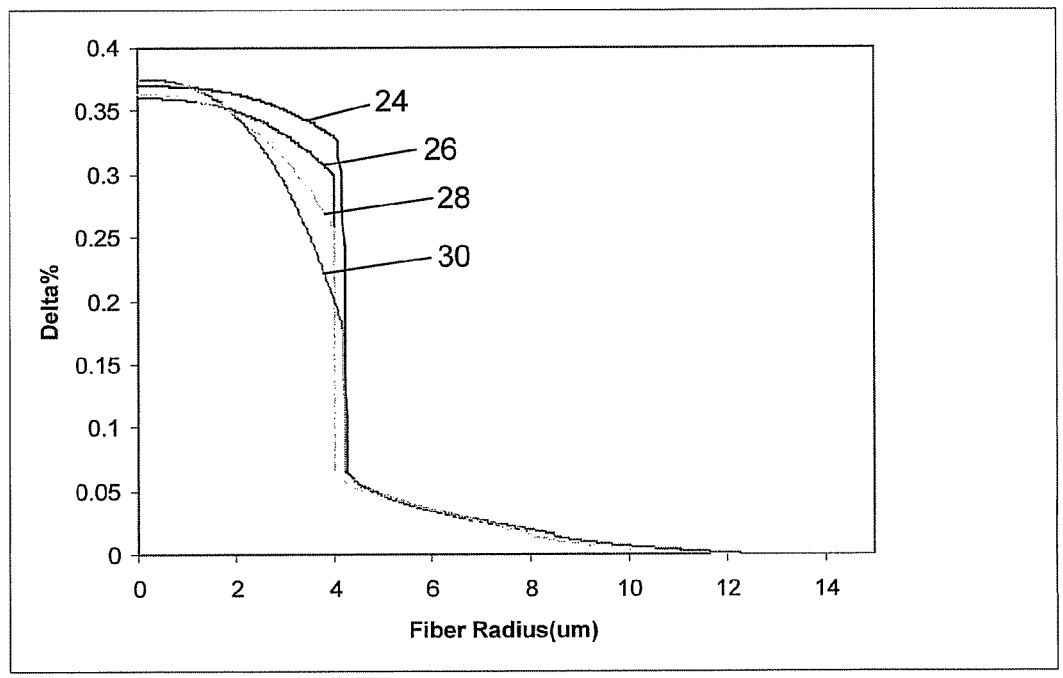
FIG. 3 illustrates refractive index profiles of additional exemplary embodiments of optical waveguide fibers.

Refractive index profiles of additional exemplary embodiments of optical fibers as disclosed herein are illustrated in FIG. 3 as 24 (Profile 2), 26 (Profile 3), 28 (Profile 4), and 30 (Profile 5). The profile parameters of the embodiment illustrated in FIG. 3 are set forth in Table 3.

TABLE 3

| Radius (μm) | Profile 2 (Delta (%)) | Profile 3 (Delta (%)) | Profile 4 (Delta (%)) | Profile 5 (Delta (%)) |
|---|---|---|---|---|
| 0 | 0.370 | 0.360 | 0.363 | 0.375 |
| 0.5 | 0.370 | 0.360 | 0.363 | 0.374 |
| 1.0 | 0.369 | 0.358 | 0.360 | 0.370 |
| 1.5 | 0.367 | 0.355 | 0.355 | 0.361 |
| 2.0 | 0.363 | 0.350 | 0.346 | 0.346 |
| 2.5 | 0.358 | 0.342 | 0.332 | 0.324 |
| 3.0 | 0.351 | 0.332 | 0.313 | 0.293 |
| 3.5 | 0.342 | 0.318 | 0.289 | 0.255 |
| 4.0 | 0.330 | 0.300 | 0.257 | 0.202 |
| 4.5 | 0.056 | 0.051 | 0.051 | 0.056 |
| 5.0 | 0.046 | 0.044 | 0.044 | 0.047 |
| 5.5 | 0.039 | 0.038 | 0.038 | 0.041 |
| 6.0 | 0.034 | 0.033 | 0.033 | 0.035 |
| 6.5 | 0.029 | 0.028 | 0.028 | 0.031 |
| 7.0 | 0.025 | 0.024 | 0.024 | 0.027 |
| 8.0 | 0.017 | 0.017 | 0.017 | 0.020 |
| 9.0 | 0.009 | 0.009 | 0.009 | 0.011 |
| 10.0 | 0.005 | 0.005 | 0.005 | 0.007 |

The modeled (predicted) performance parameters of the embodiment illustrated in FIG. 3 are set forth in Table 4. The attenuation values set forth in Table 4 are values that are predicted to result from a processing method that includes passing the fiber through a treatment zone as described in more detail below.

TABLE 4

| Property | Profile 2 | Profile 3 | Profile 4 | Profile 5 |
|---|---|---|---|---|
| Dispersion at 1310 nm (ps/(nm · km)) | 0.084 | −0.890 | −1.385 | −1.779 |
| Dispersion Slope at 1310 nm (ps/(nm² · km)) | 0.087 | 0.087 | 0.087 | 0.088 |
| Mode Field Diameter (MFD) at 1310 nm (μm) | 9.186 | 9.169 | 9.185 | 9.214 |
| Effective Area (Aeff) at 1310 nm (μm²) | 66.039 | 64.814 | 64.403 | 64.178 |
| Dispersion at 1550 nm (ps/(nm · km)) | 17.099 | 16.089 | 15.665 | 15.453 |
| Dispersion Slope at 1550 nm (ps/(nm² · km)) | 0.059 | 0.059 | 0.060 | 0.061 |
| Mode Field Diameter (MFD) at 1550 nm (μm) | 10.415 | 10.533 | 10.621 | 10.702 |
| Effective Area (Aeff) at 1550 nm (μm²) | 82.669 | 83.537 | 84.360 | 85.143 |
| LP11 Cutoff (nm) | 1434.4 | 1345.0 | 1311.0 | 1315.5 |
| λ₀ (nm) | 1309.0 | 1320.2 | 1325.9 | 1330.2 |
| Cable Cutoff (nm) | 1294.4 | 1205.0 | 1171.0 | 1175.5 |
| Attenuation at 1310 nm (dB/km) | 0.3265 | 0.3265 | 0.3253 | 0.3237 |

TABLE 4-continued

| Property | Profile 2 | Profile 3 | Profile 4 | Profile 5 |
|---|---|---|---|---|
| Attenuation at 1383 nm (dB/km) | 0.3024 | 0.3023 | 0.3012 | 0.2997 |
| Attenuation at 1410 nm (dB/km) | 0.2585 | 0.2584 | 0.2574 | 0.2559 |
| Attenuation at 1550 nm (dB/km) | 0.1860 | 0.1848 | 0.1838 | 0.1825 |
| Pin Array Macrobend Loss at 1550 nm (dB) | 4.049 | 10.541 | 15.209 | 16.751 |
| Lateral Load Microbend Loss at 1550 nm (dB/m) | 0.348 | 0.704 | 0.941 | 1.078 |
| Alpha (α) | 2.62 | 2.62 | 2.62 | 2.62 |

Optical fibers disclosed herein have an alpha profile wherein alpha (α) is greater than 2.5, such as an alpha profile wherein alpha (α) is greater than 2.5 and less than 3.0, and further such as an alpha profile wherein alpha (α) is greater than 2.5 and less than 2.7, and even further such as an alpha profile wherein alpha (α) is greater than 2.6 and less than 2.9, and yet even further such as an alpha profile wherein alpha (α) is greater than 2.6 and less than 2.7. Alpha values within these ranges can provide for lower levels of attenuation than what would otherwise be achieved.

Preferably, the initial point $r_i$ of the alpha profile is at a radius of less than 1 μm and the final point $r_f$ of the alpha profile is at a radius of at least 3 μm, such as an alpha profile wherein the initial point $r_i$ is at a radius of less than 0.5 μm and the final point $r_f$ is at a radius of at least 4 μm, and further such as an alpha profile wherein the initial point $r_i$ is at a radius of less than 0.25 μm and the final point $r_f$ is at a radius of at least 5 μm. In the embodiment illustrated in FIG. 2, Δ(r) at $r_i$ is greater than 0.35% and Δ(r) at $r_f$ is less than 0.05%. In the embodiments illustrated in FIG. 3, Δ(r) at $r_i$ is at least 0.35% and Δ(r) at $r_f$ is at least 0.20%, including at least 0.25%, and further including at least 0.30%. In the embodiments illustrated in FIG. 3, Δ(r) at $r_f$+0.5 μm is at least 0.10% less than Δ(r) at $r_f$ such as at least 0.15% less than Δ(r) at $r_f$, and further such as at least 0.20% less than Δ(r) at $r_f$, and even further such as at least 0.25% less than Δ(r) at $r_f$. Preferred embodiments corresponding to those illustrated in FIG. 3 include those in which alpha (α) is greater than 2.5 and less than 3.0, $r_i$ is between 0 and 0.5 μm, $r_f$ is between 3.5 and 4.5 μm, Δ(r) at $r_i$ is between 0.35% and 0.40%, Δ(r) at $r_f$ is between 0.20% and 0.33%, and Δ(r) at $r_f$+0.5 μm is between 0.02% and 0.10%.

Optical fibers disclosed herein preferably have a $\Delta_{1MAX}$ of greater than 0.30% and also preferably have a $\Delta_{1MAX}$ of less than 0.40%, such as 0.30%<$\Delta_{1MAX}$<0.40%, and further such as 0.35%<$\Delta_{1MAX}$<0.40%, and even further such as 0.36%<$\Delta_{1MAX}$<0.39%.

Optical fibers disclosed herein preferably have an $R_1$ of between about 4 and 12 μm, such as 5 μm<$R_1$<10 μm, and further such as 6 μm<$R_1$<8 μm.

Optical fibers disclosed herein preferably have a Δ(r) that is less than 0.01% for all radii greater than 10 μm, such as Δ(r) that is less than 0.01% for all radii greater than 8 μm, and further such as a Δ(r) that is less than 0.01% for all radii greater than 7 μm.

Optical fibers corresponding to the embodiments illustrated in FIGS. 2 and 3 are relatively easy to manufacture and can meet the industry standard performance requirements that are met by Corning's SMF-28® and SMF-28e® optical fiber while providing even lower attenuation and bend loss as compared to those fibers.

For example, optical fibers disclosed herein, including the embodiments illustrated in FIGS. 2 and 3, preferably provide for a mode field diameter at a wavelength of 1310 nm of between about 8.8 and 9.6 µm and more preferably between about 9.0 and 9.4 µm. Optical fibers disclosed herein preferably provide a mode filed diameter at a wavelength of 1550 nm of between about 9.8 and 11.0 µm and more preferably between about 10.0 and 10.8 µm. Optical fibers disclosed herein preferably provide an effective area at a wavelength of 1310 nm of between about 60 and 70 µm² and more preferably between about 62 and 68 µm². Optical fibers disclosed herein preferably provide an effective area at a wavelength of 1550 nm of between about 75 and 90 µm² and more preferably between about 78 and 86 µm². Optical fibers disclosed herein preferably have a zero dispersion wavelength, $\lambda_0$, between about 1300 and 1335 nm, and more preferably between about 1302 and 1322 nm. Optical fibers disclosed herein preferably have a zero dispersion slope of less than or equal to about 0.089 ps/(nm²·km). Optical fibers disclosed herein preferably have a dispersion at a wavelength of 1550 nm of less than 18.0 ps/(nm·km). Optical fibers disclosed herein preferably have a cable cutoff wavelength of less than or equal to 1300 nm, such as a cable cutoff wavelength of less than or equal to 1260 nm, and further such as a cable cutoff wavelength of less than or equal to 1220 nm, and even further such as a cable cutoff wavelength of less than or equal to 1200 nm, and yet even further such as a cable cutoff wavelength of less than or equal to 1180 nm.

Optical fibers disclosed herein, including the embodiments illustrated in FIGS. 2 and 3, have an attenuation of less than 0.331 dB/km at a wavelength of 1310 nm, an attenuation of less than 0.328 dB/km at a wavelength of 1383 nm, an attenuation of less than 0.270 dB/km at a wavelength of 1410 nm, and an attenuation of less than 0.190 dB/km at a wavelength of 1550 nm.

In preferred embodiments, optical fiber disclosed herein has an attenuation of less than 0.325 dB/km at a wavelength of 1310 nm, an attenuation of less than 0.323 dB/km at a wavelength of 1383 nm, an attenuation of less than 0.264 dB/km at a wavelength of 1410 nm, and an attenuation of less than 0.186 dB/km at a wavelength of 1550 nm.

In even more preferred embodiments, optical fiber disclosed herein has an attenuation of less than 0.324 dB/km at a wavelength of 1310 nm, an attenuation of less than 0.322 dB/km at a wavelength of 1383 nm, an attenuation of less than 0.263 dB/km at a wavelength of 1410 nm, and an attenuation of less than 0.185 dB/km at a wavelength of 1550 nm.

In yet even more preferred embodiments, optical fiber disclosed herein has an attenuation of less than 0.323 dB/km at a wavelength of 1310 nm, an attenuation of less than 0.310 dB/km at a wavelength of 1383 nm, an attenuation of less than 0.260 dB/km at a wavelength of 1410 nm, and an attenuation of less than 0.184 dB/km at a wavelength of 1550 nm.

In still yet even more preferred embodiments, optical fiber disclosed herein has an attenuation of less than 0.323 dB/km at a wavelength of 1310 nm, an attenuation of less than 0.300 dB/km at a wavelength of 1383 nm, an attenuation of less than 0.255 dB/km at a wavelength of 1410 nm, and an attenuation of less than 0.182 dB/km at a wavelength of 1550 nm.

In further preferred embodiments, optical fiber disclosed herein has an attenuation of less than 0.327 dB/km at a wavelength of 1310 nm, an attenuation of less than 0.303 dB/km at a wavelength of 1383 nm, an attenuation of less than 0.259 dB/km at a wavelength of 1410 nm, and an attenuation of less than 0.187 dB/km at a wavelength of 1550 nm.

In yet further preferred embodiments, optical fiber disclosed herein has an attenuation of less than 0.327 dB/km at a wavelength of 1310 nm, an attenuation of less than 0.303 dB/km at a wavelength of 1383 nm, an attenuation of less than 0.259 dB/km at a wavelength of 1410 nm, and an attenuation of less than 0.185 dB/km at a wavelength of 1550 nm.

In still yet further preferred embodiments, optical fiber disclosed herein has an attenuation of less than 0.326 dB/km at a wavelength of 1310 nm, an attenuation of less than 0.302 dB/km at a wavelength of 1383 nm, an attenuation of less than 0.258 dB/km at a wavelength of 1410 nm, and an attenuation of less than 0.184 dB/km at a wavelength of 1550 nm.

In even still yet further preferred embodiments, optical fiber disclosed herein has an attenuation of less than 0.324 dB/km at a wavelength of 1310 nm, an attenuation of less than 0.300 dB/km at a wavelength of 1383 nm, an attenuation of less than 0.256 dB/km at a wavelength of 1410 nm, and an attenuation of less than 0.183 dB/km at a wavelength of 1550 nm.

Optical fibers disclosed herein, preferably have a pin array macrobend loss of less than 10 dB at a wavelength of 1550 nm, and even more preferably less than 9.5 dB at a wavelength of 1550 nm, and yet even more preferably less than 9 dB at a wavelength of 1550 nm.

Optical fibers disclosed herein, preferably have a lateral load macrobend loss of less than 0.7 dB/m at a wavelength of 1550 nm, and even more preferably less than 0.65 dB/m at a wavelength of 1550 nm, and yet even more preferably less than 0.6 dB/m at a wavelength of 1550 nm.

In preferred embodiments, optical fibers disclosed herein are manufactured by passing the fibers through a treatment zone, which is defined as an area downstream from a draw furnace where the fiber is cooled at a rate that is slower than the cooling rate of the fiber in air at room temperature (i.e., air at about 25° C.). Preferably, the surface temperature of the fiber exiting the treatment zone is at least about 1,000° C.

The average cooling rate of the fiber in the treatment zone is defined as the fiber surface temperature at the entry point of the fiber into the treatment zone (the fiber entry surface temperature) minus the fiber's surface temperature at an exit point of the fiber out of the treatment zone (the fiber exit surface temperature) divided by the total residence time of the fiber in the treatment zone. In a preferred embodiment, the average cooling rate of the fiber in the treatment zone is less than 5,000° C./s, including less than 2,500° C./s, and further including less than 1,000° C./s, when the temperature of the fiber is at least 1,000° C., such as when the temperature of the fiber is between 1,250° C. and 1,750° C.

In at least one embodiment, the treatment zone comprises a treatment furnace. In one embodiment, the treatment furnace is disposed substantially immediately downstream from the draw furnace although the invention is not limited to embodiments where the treatment furnace is disposed substantially immediately downstream from the draw furnace. In a preferred embodiment, the treatment furnace is attached directly to the end of the draw furnace at a location where the fiber exits therefrom such that a seal is preferably formed therebetween. This minimizes unwanted entry of air into the draw furnace.

Figure 4:
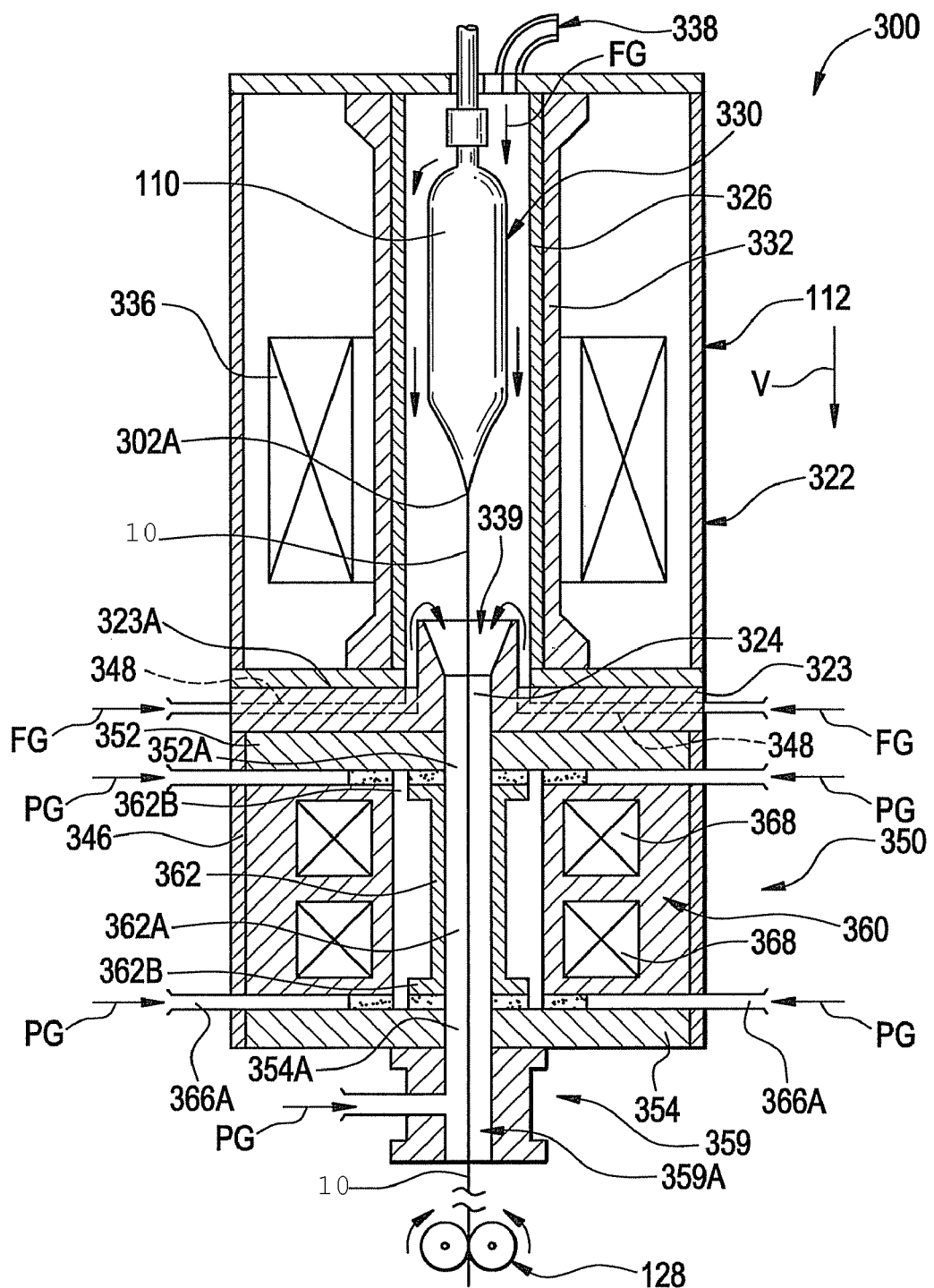
FIG. 4 illustrates a schematic, cross-sectional side view of an optical fiber fanning apparatus.

FIG. 4 illustrates an optical fiber forming apparatus 300 that can be used in the manufacture of optical fiber as disclosed herein. Apparatus 300 includes, generally, a draw furnace 112, a treatment furnace 350 and a tensioning station 128, shown as a tractor assembly, for applying tension to the drawn fiber. The apparatus 300 may be used to treat a bare optical fiber 10 from a doped glass preform 110, for example. More particularly, the draw furnace 112 may be used to form a bare optical fiber 10 and the treatment furnace 350 may thereafter be used to treat the drawn fiber 10. The tensioning station 128 serves to control and maintain the desired tension in the fiber 10. Additional conventional process steps may be included, such as non-contact diameter measurement apparatus, further fiber cooling apparatus, fiber coating and curing apparatus for applying and curing the primary and secondary fiber coatings, and spool winding apparatus. Such additional process steps are conventional and not shown for clarity. Additionally, an iris or moveable door mechanism may be employed at the bottom of the treatment furnace to minimize the amount of air entry into the treatment furnace.

The glass preform 110 is preferably formed of a doped silica glass, and preferably a silica glass doped with at least germanium. Methods and apparatus for forming the preform 110 are well known and are readily appreciated by those of skill in the art. Such methods include ND, VAD, MCVD, OVD, PCVD and the like.

The draw furnace 112 preferably includes a housing 322 surrounding the preform and having a flange 323 secured on the lower end thereof, the flange 323 serving as the exit wall of the draw furnace 112. An axial opening 324 is defined in the flange 323 through which the fiber 10 passes and through which the previously dropped glass gob may pass. An annular sleeve-like susceptor 326 (which may be, for example, formed of graphite) extends through the draw furnace 112 and defines a passage 330 therein. The passage 330 includes an upper section adapted to receive and hold the optical fiber preform 110 and a lower section through which the drawn fiber 10 passes as glass is melted and drawn off from the preform 110. The gob, formed at the initiation of drawing also passes through this section. The lower section of the passage 330 communicates with the opening 324. A hollow exit cone 339 is preferably positioned over the opening 324. An annular insulator 332 and an induction coil(s) 336 surround the susceptor 326.

A suitable inert forming gas FG, such as helium, may be introduced into the passage 330 at about 1 atmosphere of pressure through a suitable flow inlet 338 and flows downwardly and out of the draw furnace 112 through the opening 324. The draw furnace 112, as described and illustrated, is merely exemplary of suitable draw furnaces and it will be appreciated by those of skill in the art that draw furnaces of other designs and constructions, for example, using other types of heating mechanisms, susceptors and insulation, etc. may be employed.

With reference again to FIG. 4, opposed flow passages 348 extend radially through the flange 323 and terminate in openings at the upper surface 323A thereof. The passages 348 also extend vertically through the flange 323 and terminate adjacent the outer periphery of the cone 339. Forming gas FG is additionally fed through the openings of the passages 348 and flows up around the cone 339 and back down through the center opening of the cone 339. The forming gas FG may be, for example, helium gas (He), nitrogen gas ($N_2$), Argon gas (Ar), or any other suitable inert gas.

The treatment furnace 350 is positioned below, and preferably interconnected to, the flange 323. The treatment furnace 350 includes a heating unit 360 with one or more annular heating elements 368 therein. The heating element may be, for example, an electrical resistance or an induction heating coil. Openings 352A and 354A are defined in the upper and lower ends of treatment furnace 352 and 354, respectively. The openings along the draw path are sufficiently large to enable the glass gob to drop through upon initiation of draw. The ends 352, 354 and the sleeve 346 serve as the housing for the treatment furnace 350. However, it will be appreciated that other housing configurations and components may be employed. The treatment furnace 350 is preferably secured to flange 323 of the draw furnace 112 by suitable means such as fasteners.

A generally cylindrical spool or tube 362 is disposed in the heating unit 360. The spool or tube 362, which can be made up from a substantially pure silica quartz glass, ceramic, and/or carbon material, defines a passage 362A and has a pair of flanges (i.e., quartz flanges) 362B located on opposed ends thereof. The flanges 362B may be, for example, flame welded to the ends of a tube to form the spool 362. A first graphite gasket 364 is interposed between the lower surface of the flange 352 and the upper flange 362B. A second graphite gasket 364 is interposed between the lower flange 354 and the lower flange 362B.

Gas rings 366 having feed passages 366A surround the graphite gaskets 364 and have small perforations adapted to direct a purge gas PG toward the graphite gaskets 364. The purge gas PG is provided to reduce or prevent exposure of the graphite gaskets 364 to air and may be, for example, helium (He), Argon (Ar), nitrogen ($N_2$), or any other suitable inert gas.

A purge gas member 359 is affixed to the lower surface of the flange 354. A purge gas PG is pumped into the purge tube passage 359A to prevent air from entering the passage 362A from below.

The passage 362A of the tube 362 preferably has a diameter dimension D of greater than 12 mm at all places along its length, and preferably between about 12 mm and 80 mm, and more preferably between 45 mm and 80 mm to allow the glass gob formed at the initiation of drawing to readily drop therethrough.

The tensioning station 128 may be any suitable device for controlling the tension in the drawn fiber 10. Preferably, the tensioning station 128 includes a microprocessor which continuously receives input from one or more fiber tension and/or diameter sensors (not shown) and is operative to apply the tension of the fiber 10 as needed. In a preferred embodiment, the tension commanded is based upon controlling the diameter to equal a set diameter stored in memory.

The apparatus 300 may be used in the following manner to manufacture a treated optical fiber 10. The furnace induction coil 336 is operated to heat the tip 302A of the optical fiber preform 110 to a preselected draw temperature $T_D$. Preferably, the draw temperature $T_D$ is in the range of between about 1,800° C. and 2,200° C. More preferably, the draw temperature $T_D$ is in the range of between about 1,900° C. and 2,050° C. The preform tip 302A is maintained at the selected draw temperature $T_D$ so that the drawn fiber 10 is continuously drawn off of the tip 302A in a draw direction V, which is preferably vertically downward. The fiber 10 is maintained at a calculated draw tension $F_D$ as described above by the tensioning device 370 or other suitable tension applying apparatus such that the set diameter (typically 125 µm) of the fiber is met within a predefined tolerance band. The forming gas FG (e.g., helium) is pumped from the upper inlet 338 and through the passages 330, 324, 352A, 362A, 354A and out through the purge tube passage 359A.

Because the treatment device 350 is preferably secured substantially immediately adjacent the opening 324 of the draw furnace 112, the drawn fiber 10 is preferably not quenched by cooler ambient air as the fiber 10 exits the draw furnace 112. Further, the possibility of oxygen getting into the draw furnace is reduced, thereby minimizing possible degradation of the graphite susceptor 326. The bare optical fiber 10 passes through the passage 324 and is substantially immediately heated by the heating unit 360. The heating unit 360 maintains the temperature of the fiber 10 at a treatment temperature $T_T$ within a selected temperature range $T_1$ to $T_2$. The lower temperature $T_1$ is preferably between about 1,100° C. and 1,400° C. and the upper temperature $T_2$ is preferably between about 1,200° C. and 1,800° C. More preferably, the lower temperature $T_1$ is between about 1,150° C. and 1,350° C. and the upper temperature $T_2$ is between about 1,300° C. and 1,700° C. Also, as the fiber 10 passes through the passage 362A, the fiber 10 is maintained at a selected treatment tension $F_T$. Preferably, the treatment tension $F_T$ is between about 25 and 200 grams. More preferably, the treatment tension $F_T$ is between about 75 and 175 grams. The length L of the treatment zone is selected such that the drawn fiber 10 is maintained within the selected temperature range $T_1$ to $T_2$ for a selected resident treatment time $t_T$. The treated fiber 10 exits the treatment furnace 350 through the bottom opening 354A and preferably continues downwardly to additional processing stations (additional cooling, measurement, coating, etc.).

Preferably, the draw furnace 112 and the treatment furnace 350 are relatively configured and secured and the gases are supplied such that they provide an air-tight path from the passage 330 to the opening 359A.

In a preferred embodiment, the treatment furnace 350 includes a plurality of individual heaters spaced along the axial length of the treatment furnace 350. Each of the heaters encircles the fiber, and each is preferably individually controlled by a controller. During the step of heat treating, the fiber is subjected to heat from multiple heating zones; at least one of the heating zones (each zone roughly corresponding to the physical size of the heaters) of the multiple heating zones is set to different temperature as compared to another of the multiple heating zones. Preferably, the temperature of the wall of each heater is controlled by a controller such that at least one of the heating zones has a passage temperature of between 600° C. and 1,500° C. In a preferred mode of operation, a first zone closer to the draw furnace 112 is controlled to have a passage temperature at its center of between 600° C. and 1,200° C., while a second zone further away from the draw furnace is controlled to have a passage temperature of between 900° C. and 1,500° C. The actual wall temperatures will be set such that the desired fiber exit surface temperature condition is achieved to provide the desired cooling rate. If the gas used is other than helium, for example, the wall temperature would be set to a lower temperature because thermal conductivity of Argon and mixtures of Argon and Helium would have a lower coefficient of thermal conductivity and, therefore, more of a temperature difference is required between the furnace's passage temperature and the fiber temperature to achieve the same cooling rate.

In at least one preferred embodiment, the heating elements of the treatment furnace 350 are preferably molydisilicide high temperature heating elements available from Kanthal.

In at least another embodiment, the treatment zone comprises a passive treatment assembly. In one embodiment, the passive treatment assembly is disposed substantially immediately downstream from the draw furnace although the invention is not limited to embodiments where the passive treatment assembly is disposed substantially immediately downstream from the draw furnace. In a preferred embodiment, the passive treatment assembly is attached directly to the end of the draw furnace at a location where the fiber exits therefrom such that a seal is preferably formed therebetween. This minimizes unwanted entry of air into the draw furnace.

Figure 5:
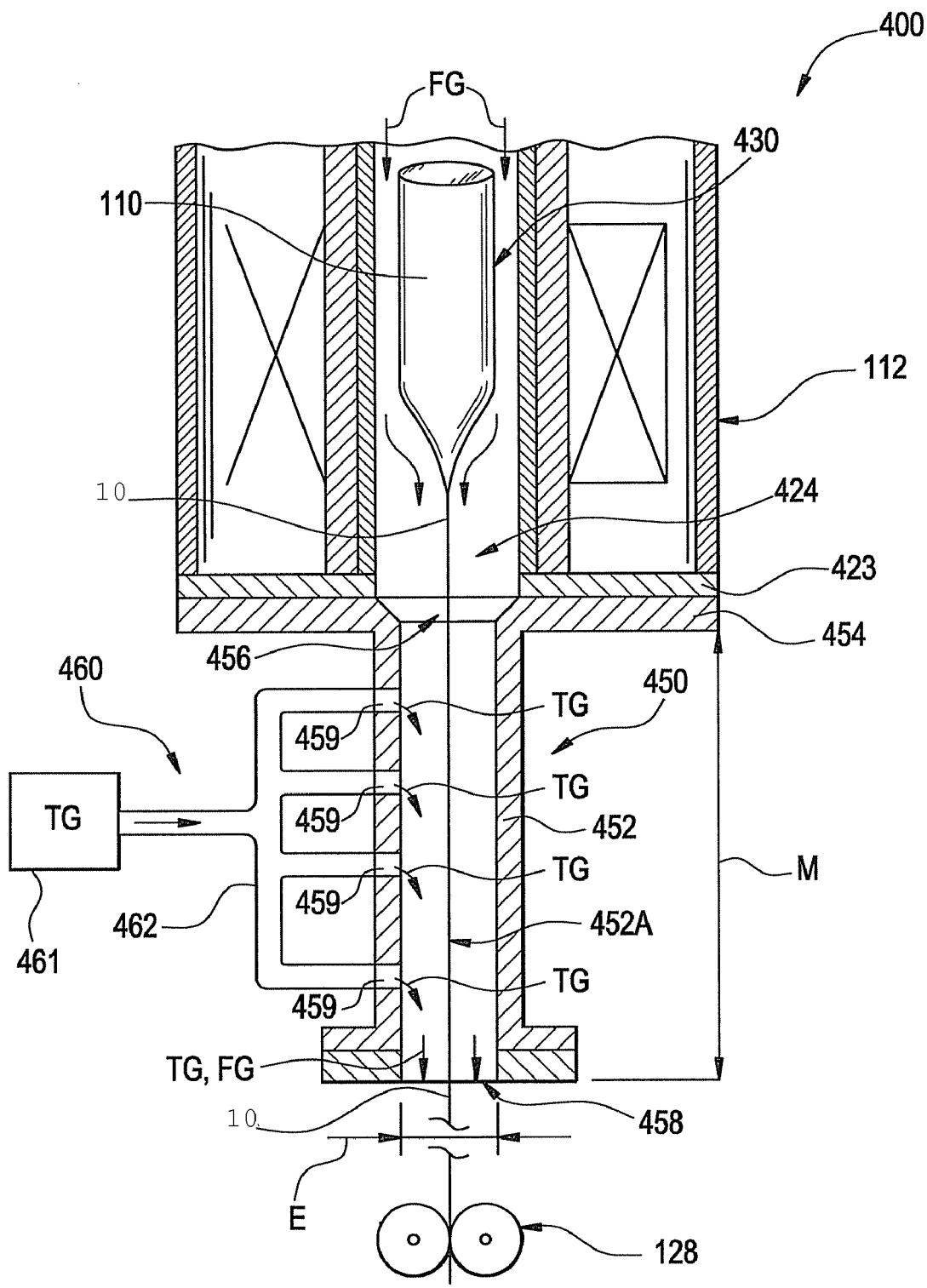
FIG. 5 illustrates a schematic, cross-sectional side view of an alternative optical fiber forming apparatus.

FIG. 5 illustrates an alternate optical fiber forming apparatus 400 that can be used in the manufacture of optical fiber as disclosed herein. Optical fiber forming apparatus 400 includes a draw furnace 112 corresponding to the draw furnace 112. In place of the treatment furnace 350, the apparatus 400 includes a passive treatment assembly 450. The assembly 450 is "passive" in that it does not include a heating device corresponding to the heating module 360 in any portion thereof. In other words, the fiber is cooled at a controlled rate without the aid of an active heating module.

The apparatus 400 includes a draw furnace 112 and a tensioning station 128 corresponding to the draw furnace 112 and the tensioning station 128, respectively. Preferably, the draw furnace 112 is of the type having a graphite susceptor. The passive treatment assembly 450 includes a tubular muffle 452 having an upper flange 454. The muffle 452 is affixed directly to the lower end wall 423 of the furnace 112 by bolts or other fasteners (not shown for clarity) that extend through holes in the flange 454 and engage the end wall 423. The muffle 452 is preferably formed of metal, such as stainless steel or aluminum.

The muffle 452 defines an upper opening 456 at a first end, an opposing lower opening 458 at a second end and a passage 452A extending therebetween. Preferably, the diameter E of the passage 452A is substantially uniform and greater than 12 mm, more preferably between about 12 mm and 80 mm, and most preferably between 45 and 80 mm. The upper opening 456 communicates with the lower opening 424 of the draw furnace 112. A plurality of axially spaced supply ports 459 are formed in the side wall of the muffle 452 and communicate with the passage 452A along its length.

A treatment gas flow system 460 is operatively and fluidly connected to the muffle 452. The treatment gas flow system 460 includes a treatment gas supply 461 that is fluidly and operatively connected to each of the ports 459 by a manifold or conduits 462. The treatment gas supply station 461 includes a supply of a selected treatment gas TG, and a pump or the like operative to pressurize the treatment gas TG sufficiently to force it through the conduits 462 and the feed ports 459 and into the passage 452A. The treatment gas supply station 461 may optionally include a heating unit to heat the treatment gas TG. However, preferably the treatment gas is supplied at about 20° C.

The apparatus 400 may be used in the following manner to form a treated optical fiber 10. Using the draw furnace 112 and the tensioning station 128, an optical fiber 10 is drawn from a preform 110 in the manner described above with regard to the apparatus 300, at a draw temperature and a draw tension sufficient to introduce a heat aging defect. As the fiber 10 is being drawn, a forming gas FG is introduced through an inlet identical to that shown in FIG. 4. The forming gas flows through the passage 430 about the preform 110 and the fiber 10, through the opening 424 in the furnace end wall 423 and into the first end of the passage 452A through the opening 456.

The drawn fiber 10 enters the passage 452A of the muffle 452 immediately upon exiting the furnace 112. As the fiber 10 passes through the passage 452A, the treatment gas TG is pumped from the treatment gas supply 461 into the passage 452A through the at least two axially spaced supply ports 459 as indicated by the arrows in FIG. 5. The treatment gas flows into the passage 452A at the various stages and mixes with the forming gas FG. Preferably, the treatment gas TG has a thermal conductivity k of less than about $120 \times 10^{-6}$ cal/(sec) (c)$^2$ (° C./cm), and more preferably less than about $65 \times 10^{-6}$ cal/(sec) (c)$^2$ (° C./cm) at 25° C. The mixture of the treatment gas TG and the forming gas FG flows through the passage 452A and exits through the second end opening 458.

The treatment gas TG has a lower thermal conductivity than the forming gas FG. Preferably, the thermal conductivity of the treatment gas TG is less than 40% of, and more preferably less than 20% of, the thermal conductivity of the forming gas FG. The treatment gas TG is preferably nitrogen or argon, but could also include krypton or xenon.

As the drawn fiber 10 is drawn through passage 452A, the drawn fiber 10 is maintained at the selected treatment tension $F_T$, and the treatment temperature $T_T$ of the fiber 10 while in the passage 452A is maintained in the selected temperature range $T_1$-$T_2$ for the selected residence time $t_T$ as discussed above with respect to the apparatus 300. In the manner described above with respect to the apparatus 300, the selected treatment tension $F_T$, temperature range $T_1$ to $T_2$ and residence time $t_T$ are cooperatively selected such that they reduce or eliminate the heat aging defect in the fiber 10, thereby providing a treated bare optical fiber 10. In the case of the apparatus 400, the length M of the passage 452A of the passive treatment device 450 is selected to provide the desired residence time $t_T$ in view of the draw speed of the fiber 10.

The lower thermal conductivity of the treatment gas TG slows heat transfer from or cooling of the drawn fiber 10 so that the fiber 10 is maintained in the selected temperature range $T_1$-$T_2$ while in the passage 452A. The flow rate, turbulence and temperature of the treatment gas TG may be selected as appropriate to provide the desired cooling rate. In accordance with this embodiment of the invention, the desired cooling rate in the treatment zone may be between 1,000° C./sec and 3,500° C./sec in a temperature range of between 1,200° C. to 1,500° C.

Figure 6:
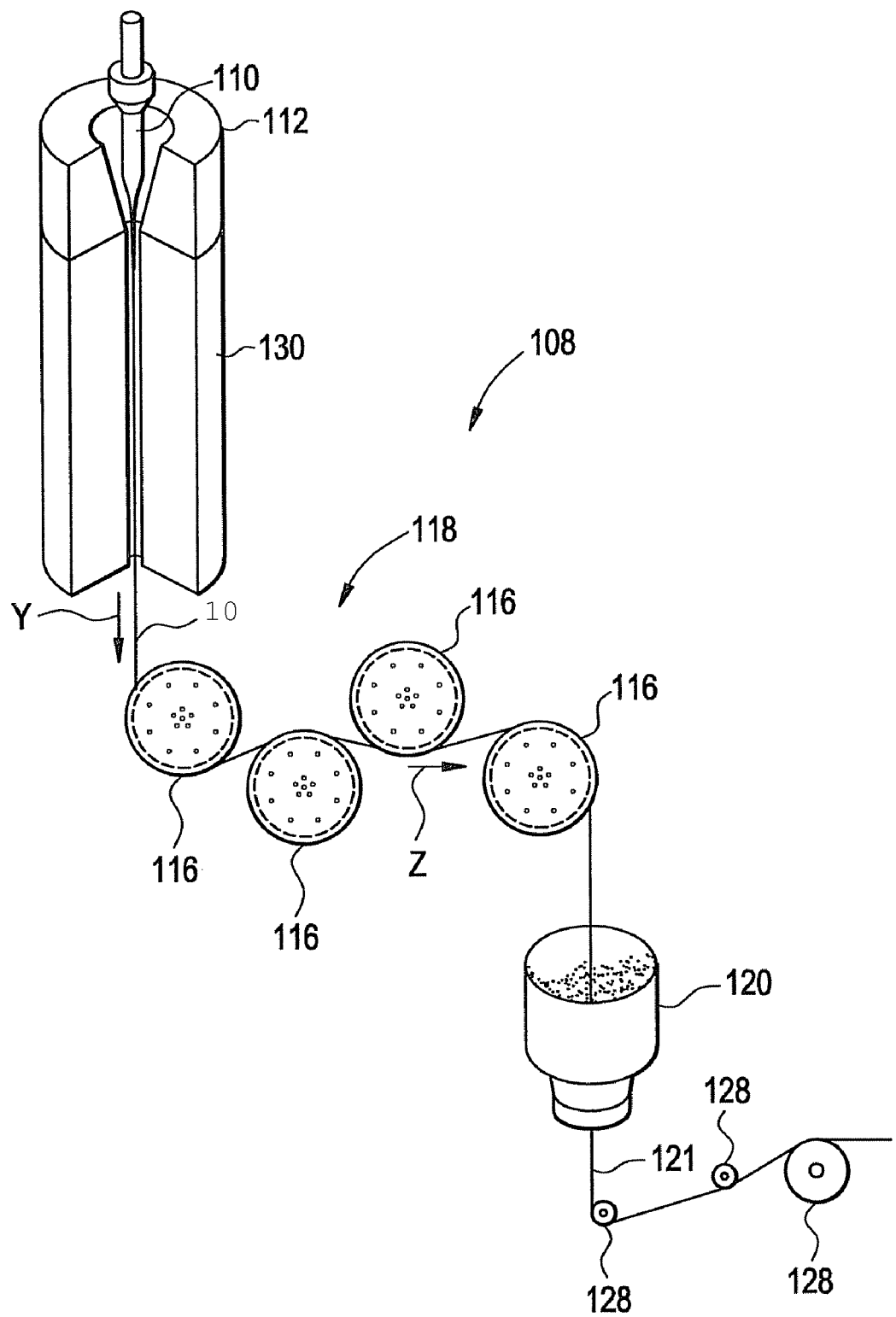
FIG. 6 illustrates an optical fiber production system.

In a particularly preferred embodiment, draw furnace 112 and treatment zone 130 (which can comprise, for example, treatment furnace 350 as illustrated in FIG. 4 or passive treatment assembly 450 as illustrated in FIG. 5) are incorporated into a system 108 for producing optical fibers as illustrated in FIG. 6. Once optical fiber 10 leaves the treatment zone 130, the optical fiber contacts at least one stationary fluid bearing 116 (shown in FIG. 6 as a plurality of fluid bearings) and shifts from moving along a substantially first or vertical pathway (Y) to second pathway (Z). As illustrated, second pathway (Z) is oriented horizontally or orthogonal to the first path, but it should be understood that systems and methods described herein can redirect an optical fiber along any non-linear pathway prior to a protective coating being applied thereto.

In the embodiment illustrated in FIG. 6, optical fiber 10 passes through fluid bearings 116 and is subjected to a coating unit 120 where a primary protective coating layer 121 is applied to the outer surface of the optical fiber 10. After leaving the coating unit 120, the optical fiber with protective layer 121 (no longer being bare) can go through a variety of other processing stages within the system (not shown). Drawing mechanisms 128 are used to provide the necessary tension on the optical fiber as it is drawn throughout the entire system as shown in FIG. 6 and eventually wound onto a fiber storage spool (not shown).

As the optical fiber 10 is transported over the fluid bearings 116 (described later herein), the region of fluid cushion on each fluid bearing 116 cools the optical fiber 10. For example, referring to FIG. 6, the optical fiber 10 exiting the treatment zone 130 can have a temperature of around 500° C.-1500° C. as it enters the fluid bearings 116. In some preferred embodiments, the optical fiber 10 enters the fluid bearings 116 at a point where the fiber temperature is less than 1,300° C., more preferably less than 1,200° C., and in some embodiments less than 1,100° C. Because the fluid bearing employs a moving fluid stream which supports the optical fiber, the optical fiber is cooled at a rate which is faster than the fiber would cool in non-moving air at room temperature, such as is present immediately outside the draw furnace. The greater the temperature differential between the optical fiber and the fluid in the fluid bearing (which is preferably room temperature air), the greater the ability of the fluid bearing to cool the optical fiber 10. In another embodiment, the fluid emitted through the fluid bearings 116 can actually be cooled so as to cool the optical fiber at an even faster rate. The fluid associated with the region of fluid cushion can provide sufficient cooling to the optical fiber 10 so that it can be directly transported to the coating unit 120 and a protective layer can be applied to the outer surface of the optical fiber 10 to produce a coated fiber 121. In one embodiment, the region of fluid cushion of the fluid bearing 116 can include a fluid that is nonreactive relative to the optical fiber 10 (e.g., air, helium).

Figure 7:
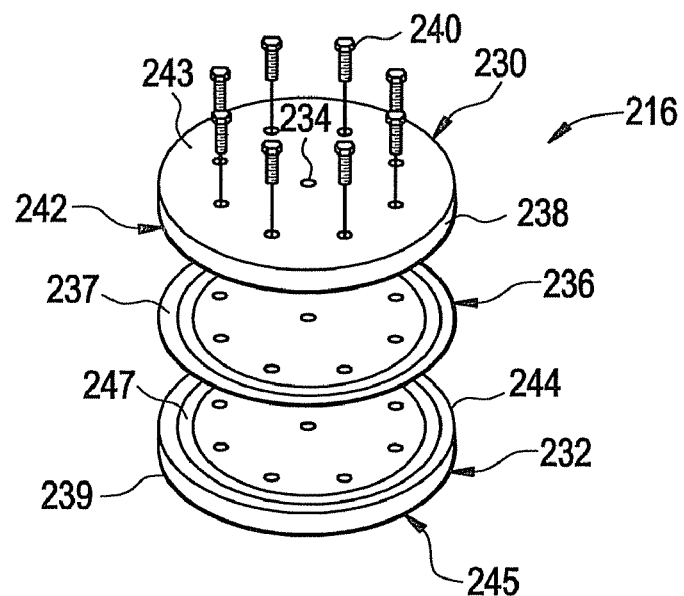
FIG. 7 illustrates an exploded view of a fluid bearing for use in an optical fiber production system.

FIG. 7 illustrates an embodiment of a bearing assembly 216 that can be used for producing an optical fiber as described herein. In the embodiment shown in FIG. 7, the bearing assembly 216 (referred to sometimes as "fluid bearing") includes a first plate 230, a second plate 232, an inner member 236 and at least one opening 234 in at least one of the first and second plates. The first plate 230 and the second plate 232 can be made of metal and include an arcuate outer surface 238, 239 and can be positioned on opposite sides of each other. The first plate 230 and the second plate 232 are connected by fasteners (e.g., bolts 240) to link the plates 230, 232 together so that fluid may be passed through the bearing assembly 216. The arcuate outer surfaces 238, 239 of each plate 230, 232 generally lie along the circumference of each of the respective plates 230, 232. The first plate 230 and the second plate 232 each have respective inner 242, 244 and outer faces 243, 245, wherein the inner faces 242, 244 of the plates 230, 232 are aligned with each other. A recessed portion 247 extends at least partially around the inner faces 242, 244 of either the first plate 230 or the second plate 232 to provide a plenum for fluid flow. In another embodiment, the recessed portion may comprise a variety of configurations to provide uniform flow into fiber support channel 250, as discussed later herein.

In the embodiment illustrated, the arcuate outer surfaces 238, 239 of the first plate 230 and the second plate 232 are preferably substantially aligned and form a region between the outer surfaces 238, 239 of both the first plate 230 and the second plate 232. This region is configured to receive an optical fiber so that optical fiber can travel along this region without rotation of the bearing assembly. This fiber support channel 250 is more clearly illustrated in the embodiment shown in FIG. 8 (discussed later herein). At least one opening 234 passes through at least one of the first plate 230 and the second plate 232. As shown in FIG. 7, the opening 234 of the first plate 230 and the second plate 232 allow for fluid (e.g., air, helium or other desired gas or liquid) to be fed through the bearing assembly 216 so that the fluid can exit the bearing assembly 216 at the fiber support channel 250 which is formed between the first plate 230 and the second plate 232.

In addition, as shown in the embodiment of FIG. 7, the bearing assembly 216 can include an inner member 236 positioned between the first plate 230 and the second plate 232. This inner member 236 (e.g., a shim 237) is configured to aid in directing the fluid to the region between the outer surfaces 238, 239 of the first plate 230 and the second plate 232 such that the fluid exits the fiber support channel 250 having a predetermined flow direction. The inner member 236 rests between the first plate 230 and second plate 232 to provide a gap there between. The inner member 236 directs the fluid such that it exits the fiber support channel 250 having a predetermined flow direction. If desired, inner member 236 can comprise a plurality of fingers (not shown) to further control fluid flow by suppressing non-radial flow. In addition, the inner member 236 serves as a sealing portion to provide substantial contact between the first plate 230 and the second plate 232. Inner member may also include notches to facilitate entry and exit of the optical fiber.

Figure 8:
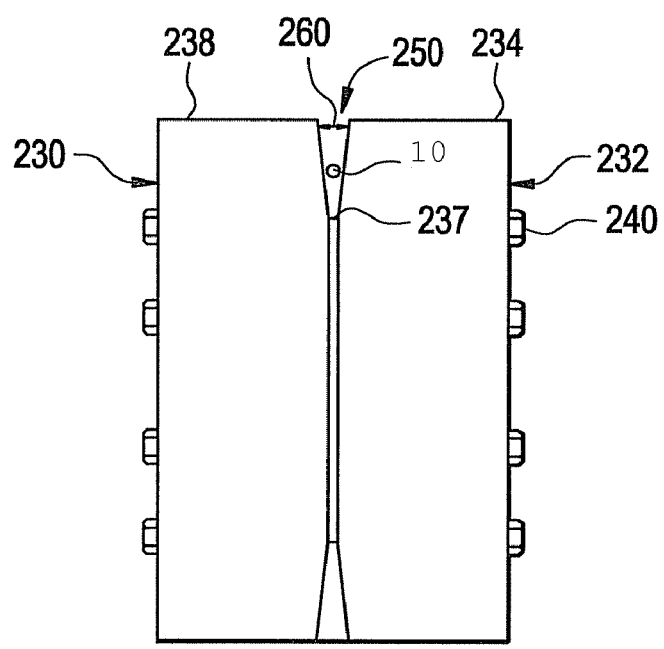
FIG. 8 illustrates a side plain view of a fluid bearing having a tapered region for an optical fiber production system.

As shown in FIG. 8, the fiber support channel 250 formed between the outer surfaces 238, 239 of the first plate 230 and the second plate 232 can be tapered where the fluid exits between the first plate 230 and the second plate 232. In another embodiment however, fiber support channel 250 can include a parallel or reverse tapered shape, for example. In addition, the opening 260 within the tapered fiber support channel 250 is variable depending on where the optical fiber 10 is vertically positioned. Preferably, the opening 260 and the fiber support channel 250 is configured so that, for the particular draw tensions and draw speeds employed and flow rates of the fluid through the opening 260, the optical fiber is maintained in a section of fiber support channel 250 which is less than 500, more preferably less than 400, even more preferably 300, and most preferably less than 200 microns wide, for a fiber having a typical outer diameter of 125 microns. Thus, the fiber is preferably retained within a region of the channel 250 which is between 1 and 2 times the diameter of the fiber, more preferably between 1 and 1.75 times the diameter of the fiber, and most preferably between 1 and 1.5 times the diameter of the fiber. Preferably, the fiber is located within a region of said channel such that the distance between the outer fiber and each wall is between 0.05 and 0.5 times the fiber diameter.

The fluid bearings described herein enable the optical fiber to travel along the region of fluid cushion so as to prevent or substantially prevent actual mechanical contact between the optical fiber and the bearing assembly, e.g., the fiber travels within fiber support channel 250 without contacting either of plates 230 or 232. In addition, because of the size and configuration of the region, the fluid bearing is capable of maintaining the fiber within the region without mechanical contact through a range of draw tensions without active control of the fluid flow. Referring to FIG. 8, the fluid flow can be important to prevent the optical fiber 10 from moving towards the bottom of the fiber support channel 250 and coming in contact with the shim 237 or the sides of the fiber support channel 250. This is particularly important when the optical fiber is still bare so that the fiber quality is not compromised by the mechanical contact with the bearing assembly.

Other factors influencing fiber position within fiber support channel 250 include the draw tension. For example, fiber pulled with 200 g of tension will float lower within fiber support channel 250 than fiber pulled with a tension of 100 g given the same fluid flow. As such, it is important that the fluid exiting the region of the fluid bearing be sufficient to maintain the optical fiber at the desired location for the particular fiber draw speed and draw tension employed.

The radius of the fluid bearings 116 is not critical. In some embodiments, each fluid bearing is constructed to result in a fiber turn radius of from about 8 to 16 cm. Larger or smaller radius fluid bearings can be employed, or additional fluid bearings can be employed (such as is illustrated in FIG. 1) for example depending on whether greater cooling is desired (in which case larger radius fluid bearing may be preferred) or the constraints of the fiber draw process.

In preferred embodiments, optical fiber is drawn at a draw rate of greater than or equal to 15 m/s, preferably greater than or equal to 25 m/s, and even more preferably greater than or equal to 35 m/s, followed by heat treating the optical fiber by maintaining the optical fiber in a treatment zone while subjecting the optical fiber to an average cooling rate in the treatment zone of less than 5,000° C./s, such as an average cooling rate of between 500° C./s and 5,000° C./s, including an average cooling rate of between 500° C./s and 2,500° C./s, and further including an average cooling rate of between 500° C./s and 1,000° C./s.

In the embodiment illustrated in FIG. 6, the length of the treatment zone 130 is preferably between about 2 m and 10 m, and more preferably between about 3 m and 8 m, such as between about 4 m and 6 m. The preferred length will depend on the draw speed of the fiber 10 and examples of ranges of a draw speed are from about 5 m/s to about 45 m/s, such as from about 10 m/s to about 35 m/s, including from about 15 m/s to about 25 m/s. The presence of fluid bearings 116 (as shown in FIG. 6), downstream from treatment zone 130 enables the treatment zone 130 to have a longer length. A treatment furnace 350 with a longer length, in turn enables the production of optical fiber with lower attenuation.

In preferred embodiments, the residence time of the optical fiber 10 in the treatment zone 130 ranges from 0.05 seconds to 0.50 seconds, such as 0.10 seconds to 0.35 seconds, and further such as 0.15 seconds to 0.25 seconds.

Methods involving passing optical fiber through a treatment zone as described herein can include an active heating assembly, as illustrated in FIG. 4, or a passive heating assembly, as illustrated in FIG. 5, wherein the active or passive heating assembly can be used alone or in combination with a bearing assembly, as illustrated in FIG. 6. Following the processing steps described herein, additional processing steps may also be used, such as a standard deuterium treatment using methods known in the art.

Embodiments disclosed herein are further clarified by the following example.

EXAMPLE 1

About 430 km of optical fiber was manufactured to have a refractive index profile corresponding to the profile illustrated in FIG. 2. The optical fibers were manufactured using an optical fiber forming apparatus similar to that illustrated in FIG. 4, wherein a treatment furnace was positioned downstream from a draw furnace, the heated portion of the treatment furnace having a length of about 1.5 meters and a wall temperature setpoint of about 600° C. The fiber was drawn at a draw rate of about 14 m/s at a draw tension of about 150 grams. Measured performance parameters for the optical fibers are set forth in Table 5. As can be seen from Table 5, the measured attenuation values are lower than the modeled (predicted) values set forth in Table 2.

TABLE 5

| Parameter | Average | Median | Minimum | Maximum |
| --- | --- | --- | --- | --- |
| mode field diameter (MFD) at 1310 nm (µm) | 9.184 | 9.176 | 9.143 | 9.243 |
| $\lambda_0$ | 1318.768 | 1318.726 | 1317.946 | 1320.095 |
| cable cutoff (nm) | 1196.861 | 1198.899 | 1166.043 | 1237.194 |
| attenuation at 1310 nm (dB/km) | 0.322 | 0.322 | 0.320 | 0.323 |
| attenuation at 1383 nm (dB/km) | 0.298 | 0.297 | 0.285 | 0.321 |
| attenuation at 1410 nm (dB/km) | 0.255 | 0.254 | 0.251 | 0.262 |
| attenuation at 1550 nm (dB/km) | 0.183 | 0.183 | 0.182 | 0.184 |

It will be apparent to those skilled in the art that various modifications and variations can be made without departing from the spirit and scope of the invention.

What is claimed is:

1. An optical waveguide fiber comprising:
a core and a cladding, the core having a relative refractive index profile $\Delta(r)$ expressed in units of %, said core comprising an alpha profile having an initial point $r_i$ and a final point $r_f$, wherein alpha ($\alpha$) is greater than 2.5 and less than 3.0, a maximum relative refractive index $\Delta_{1MAX}$, and an outer radius $R_1$;
and the core and the cladding provide a fiber with an attenuation of less than 0.331 dB/km at a wavelength of 1310 nm, an attenuation of less than 0.328 dB/km at a wavelength of 1383 nm, an attenuation of less than 0.270 dB/km at a wavelength of 1410 nm, and an attenuation of less than 0.190 dB/km at a wavelength of 1550 nm.

2. The optical waveguide fiber of claim 1, wherein $0.30\% < \Delta_{1MAX} < 0.40\%$.

3. The optical waveguide fiber of claim 1, wherein the core and the cladding provide a fiber with an attenuation of less than 0.325 dB/km at a wavelength of 1310 nm, an attenuation of less than 0.323 dB/km at a wavelength of 1383 nm, an attenuation of less than 0.264 dB/km at a wavelength of 1410 nm, and an attenuation of less than 0.186 dB/km at a wavelength of 1550 nm.

4. The optical waveguide fiber of claim 1, wherein $2.6 < \text{alpha} (\alpha) < 2.9$.

5. The optical waveguide fiber of claim 1, wherein the core and the cladding provide a fiber with a pin array macrobend loss of less than 10 dB at a wavelength of 1550 nm.

6. The optical waveguide fiber of claim 1, wherein the core and the cladding provide a fiber with a lateral load microbend loss of less than 0.7 dB/m at a wavelength of 1550 nm.

7. The optical waveguide fiber of claim 1, wherein the core and the cladding provide a fiber with an attenuation of less than 0.323 dB/km at a wavelength of 1310 nm, an attenuation of less than 0.300 dB/km at a wavelength of 1383 nm, an attenuation of less than 0.255 dB/km at a wavelength of 1410 nm, and an attenuation of less than 0.182 dB/km at a wavelength of 1550 nm.

8. The optical waveguide fiber of claim 1, wherein the initial point $r_i$ of the alpha profile is at a radius of less than 1 μm and the final point $r_f$ of the alpha profile is at a radius of at least 4 μm.

9. The optical waveguide fiber of claim 1, wherein $\Delta(r)$ at $r_f$ is at least 0.2%.

10. The optical waveguide fiber of claim 9, wherein $\Delta(r)$ at $r_f + 0.5$ μm is at least 0.10% less than $\Delta(r)$ at $r_f$.

11. The optical waveguide fiber of claim 1, wherein the core and the cladding provide a fiber with a cable cutoff wavelength of less than or equal to 1260 nm.

12. The optical waveguide fiber of claim 1, wherein the core and the cladding provide a fiber with a mode field diameter at a wavelength of 1310 nm of between about 8.8 and 9.6 μm and a mode field diameter at a wavelength of 1550 nm of between about 9.8 and 11.0 μm.

13. The optical waveguide fiber of claim 1, wherein the core and the cladding provide a fiber with an effective area at a wavelength of 1310 nm of between about 60 and 70 μm² and an effective area at a wavelength of 1550 nm of between about 75 and 90 μm².

14. The optical waveguide fiber of claim 1, wherein the core and the cladding provide a fiber having a zero dispersion wavelength, $\lambda_0$, between about 1302 and 1322 nm and a zero dispersion slope of less than or equal to about 0.089 ps/(nm²·km).

15. The optical waveguide fiber of claim 1, wherein the core and the cladding provide a fiber having a dispersion at a wavelength of 1550 nm of less than 18.0 ps/(nm·km).

16. A method for producing an optical fiber, the method comprising
drawing the fiber from a heated glass source, and
treating the optical fiber by maintaining the optical fiber in a treatment zone, while subjecting the optical fiber to an average cooling rate in the treatment zone defined as a fiber entry surface temperature minus a fiber exit surface temperature divided by the total residence time of the optical fiber in the treatment zone of less than 5,000° C./s, wherein the surface temperature of the optical fiber exiting the treatment zone is at least about 1,000° C.;
wherein the optical fiber has a core and a cladding and wherein
the core and the cladding provide a fiber with an attenuation of less than 0.323 dB/km at a wavelength of 1310 nm, an attenuation of less than 0.310 dB/km at a wavelength of 1383 nm, an attenuation of less than 0.260 dB/km at a wavelength of 1410 nm, and an attenuation of less than 0.184 dB/km at a wavelength of 1550 nm.

17. The method of claim 16, wherein the length of the treatment zone is at least about 5 meters.

18. The method of claim 16, wherein the fiber is drawn at a draw speed of greater than or equal to 25 m/s.

19. The method of claim 16, wherein the steps of drawing the fiber from a heated glass source and treating the fiber in a treatment zone occur along a first pathway and the method further comprises:
contacting the bare optical fiber with a region of fluid in a fluid bearing, said fluid bearing comprising a channel, said channel defined by at least two sidewalls, the fiber being retained within a region of said channel which is sufficient to cause said fiber to be levitated within the channel substantially as a result of a pressure differential which is present below the fiber within the channel, said pressure differential caused by a higher pressure caused by said fluid being supplied below the fiber within the channel compared to the pressure which is present above the fiber, and
redirecting the fiber along a second pathway as said bare optical fiber is drawn across said region of fluid cushion.

20. An optical fiber made by the method of claim 16.

* * * * *